United States Patent
Wagner et al.

(10) Patent No.: US 10,450,717 B1
(45) Date of Patent: Oct. 22, 2019

(54) ATTACHMENT ASSEMBLY FOR A WORK VEHICLE WITH REINFORCEMENT MEMBERS

(71) Applicant: Deere & Company, Moline, IL (US)

(72) Inventors: Benjamin R. Wagner, Dubuque, IA (US); Hema V. Guthy, Moline, IL (US); Sankaran Subramaniam, Bettendorf, IA (US); Nathan F. Tortorella, Bettendorf, IA (US); Mohamad S. El-Zein, Bettendorf, IA (US); Timothy A. Klousia, Dubuque, IA (US); Wylie E. Pfaff, Platteville, WI (US); Hector Portillo, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/382,687

(22) Filed: Apr. 12, 2019

(51) Int. Cl.
*E02F 3/38* (2006.01)
*E02F 9/00* (2006.01)
*F16C 11/04* (2006.01)

(52) U.S. Cl.
CPC ............. *E02F 3/382* (2013.01); *E02F 9/006* (2013.01); *F16C 11/045* (2013.01)

(58) Field of Classification Search
CPC ............. E02F 3/38; E02F 3/382; E02F 3/384
USPC ........................................................ 414/727
See application file for complete search history.

(56) References Cited

U.S. PATENT DOCUMENTS

| | | | | |
|---|---|---|---|---|
| 2,610,754 | A | * 9/1952 | Inskeep | E02F 3/38 414/727 |
| 3,947,191 | A | * 3/1976 | Milner, Jr. | B66C 23/64 403/334 |
| 5,245,770 | A | * 9/1993 | Ko | B29C 70/347 264/46.5 |
| 6,341,467 | B1 | 1/2002 | Wycech | |
| 6,648,582 | B2 | 11/2003 | Mayer et al. | |
| D646,306 | S | 10/2011 | Bradley et al. | |
| 2010/0303541 | A1* | 12/2010 | Okumura | E02F 3/30 403/306 |
| 2014/0056677 | A1* | 2/2014 | Takahashi | E02F 3/38 414/727 |
| 2018/0087235 | A1* | 3/2018 | Wittendorf | E02F 3/382 |

FOREIGN PATENT DOCUMENTS

JP   11200397 A * 7/1999 ............... E02F 3/38

* cited by examiner

*Primary Examiner* — Gerald McClain (57) ABSTRACT

In accordance with an example embodiment, a structural attachment assembly for a work vehicle is disclosed. The structural attachment assembly comprises opposing first and second connector ends. The first connector end is arranged for removable or fixed coupling to a frame of the work vehicle and the second connector end is arranged for removable or fixed coupling to another member of the attachment assembly. A support structure is coupled to and interposedly arranged between the first connector end and the second connector end. The support structure comprises a plurality of walls with inner surfaces defining an interior cavity. The interior cavity comprises a first reinforcement member and a second reinforcement member relatively arranged to form a structural reinforcement member that extends substantially through a length of the interior cavity.

20 Claims, 8 Drawing Sheets

ATTACHMENT ASSEMBLY FOR A WORK VEHICLE WITH REINFORCEMENT MEMBERS

TECHNICAL FIELD

The present disclosure relates generally to attachment assemblies for work vehicles, and, more particularly to a structural attachment assembly having a structural reinforcement member.

BACKGROUND

In the field of construction, heavy machinery such as loaders and other material handling equipment are widely used to perform various ground work and move large quantities of material. Such equipment is generally equipped with loading tools such as buckets that are mechanically connected to a boom and a dipper stick. During lift and manipulation of the bucket, substantial mechanical loads are transmitted to the mechanical linkage (i.e., the boom and dipper stick) which connects the bucket to the frame of the work machine. Therefore, to address such concerns, there is a need in the art for an improved boom assembly.

SUMMARY

According to an aspect of the present disclosure, a structural attachment assembly for a work vehicle is disclosed. The structural attachment assembly comprises opposing first and second connector ends. The first connector end is arranged for removable or fixed coupling to a frame of the work vehicle and the second connector end is arranged for removable or fixed coupling to another member of the attachment assembly. A support structure coupled to and interposedly arranged between the first connector member and the second connector member, the support structure comprising a plurality of walls with inner surfaces defining an interior cavity, the interior cavity having a first reinforcement member and a second reinforcement member relatively arranged to form a structural reinforcement member that extends substantially through a length of the interior cavity.

According to another aspect of the present disclosure, a work tool attachment for a work vehicle is disclosed. The work tool attachment comprises at least one ground engaging apparatus operable to perform one or more ground engaging tasks. A structural attachment assembly is coupled to or integrally formed with the ground engaging apparatus, the structural attachment assembly comprising at least one support structure, a first connector end, and a second connector end. A structural reinforcement member arranged within the support structure, the structural reinforcement member comprising a first reinforcement member and a second reinforcement member relatively arranged to extend substantially through a length of an interior cavity of the support structure.

According to another aspect of the present disclosure a method is disclosed. The method comprises providing a structural attachment assembly comprising a support structure and at least one connector end, the support structure comprising a plurality of walls arranged to define an interior cavity. A first reinforcement member is formed within the interior cavity of the support structure. A second reinforcement member is formed within an interior cavity of the support structure in apposition to the first reinforcement member to form a structural reinforcement member.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
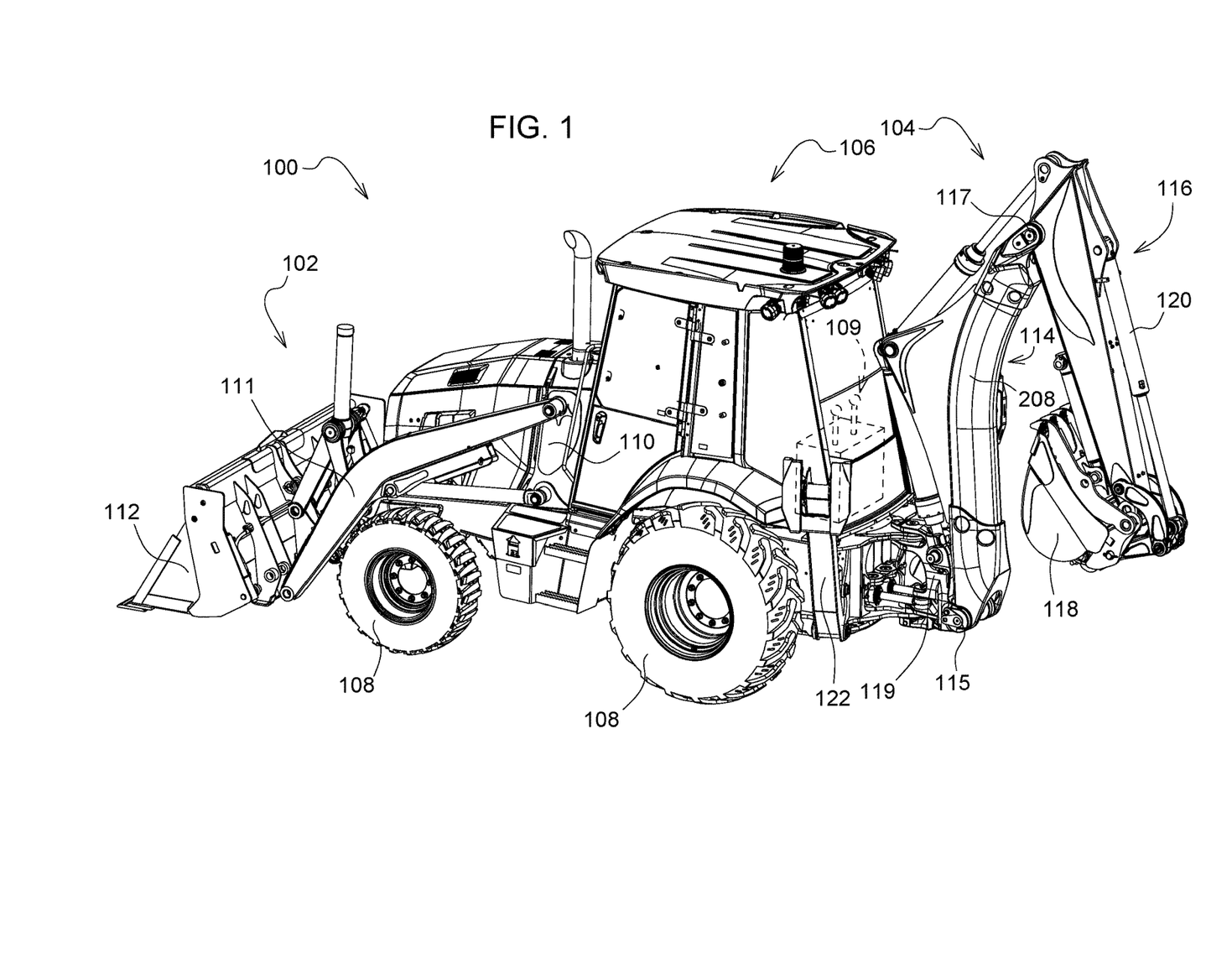
FIG. 1 is an illustration of a work vehicle according to an embodiment.

Referring to FIG. 1, a work vehicle 100 having a structural attachment assembly 210 is shown. Although in FIG. 1 the work vehicle 100 is shown as comprising a loader (e.g., backhoe loader), it should be noted that, in other embodiments, the type of work vehicle 100 can vary according to application and/or specification requirements. For example, in some embodiments, the work vehicle 100 can comprise tracked or unmanned vehicles. Additionally, in other embodiments, the work vehicle 100 may also comprise excavators, forestry equipment, or other suitable vehicles, with embodiments discussed herein being merely for exemplary purposes to aid in an understanding of the present disclosure.

The work vehicle 100 can comprise a frame 110 and an operator cab 106 supported by ground engaging wheels 108. An operator controls the functions of the work vehicle 100 from the operator cab 106 via controls 109. In some embodiments, a front attachment 102 and a rear attachment 104 can be coupled to the work vehicle 100 to allow for a variety of ground engaging functions such as material handling or excavating to be performed. The front attachment 102 (e.g., a first work tool attachment) can comprise a loader bucket 112 coupled to the frame 110 via a linkage 111 that is arranged to facilitate movement of the loader bucket 112 relative to the frame 110. The rear attachment 104 (e.g., a second work tool attachment) can comprise a boom assembly 114, an extension arm 116 (e.g., a dipper stick), and a ground engaging tool 118 coupled to a lower end of the extension arm 116. For example, the ground engaging tool 118 can be coupled to the extension arm 116 by a bucket linkage 121, which provides for manipulation of the ground engaging tool 118 through actuation of a hydraulic cylinder 120. Although the loader bucket 112 and the ground engaging tool 118 are shown as including buckets, it should be noted that, in other embodiments, either apparatus can comprise other suitable tools such as rippers, hammers, or forks, for example.

The boom assembly 114 can be arranged to extend longitudinally between a proximal end 115 and a distal end 117. The boom assembly 114 can be pivotally coupled to the work vehicle 100 via a swing frame 119 at its proximal end 115, and pivotally coupled to the extension arm 116 at its distal end 117. As shown in FIG. 1, a pair of stabilizers 122 can be coupled to opposing sides of the swing frame 119 to provide even weight distribution and stabilization for the rear of the work vehicle 100. In some embodiments, the boom assembly 114 can further comprise a structural attachment assembly 210 as will be discussed in further detail with reference to FIGS. 2A-2D, which is arranged to provide increased stability and support for load bearing structures such as the boom assembly 114.

As will be appreciated by those skilled in the art, FIG. 1 is provided for illustrative and exemplary purposes only and is in no way intended to limit the present disclosure or its applications. In other embodiments, the arrangement and/or structural configuration of the various vehicle assemblies and components can vary. For example, in some embodiments, the front or rear attachments 102, 104 can comprise one or more sensors or other structural components mounted to an external or internal surface of the assemblies and components attached thereto. In other embodiments, the location and/or external and internal geometrical configurations of the structural attachment assembly 210 can and will vary according to design and specification requirements as will be discussed herein. Additionally, although in embodiments discussed herein the structural attachment assembly 210 is shown as being included in the boom assembly 114, it should be noted that, in other embodiments, the structural attachment assembly 210 can be included in other assemblies such as extension arm 116.

Figure 2A:
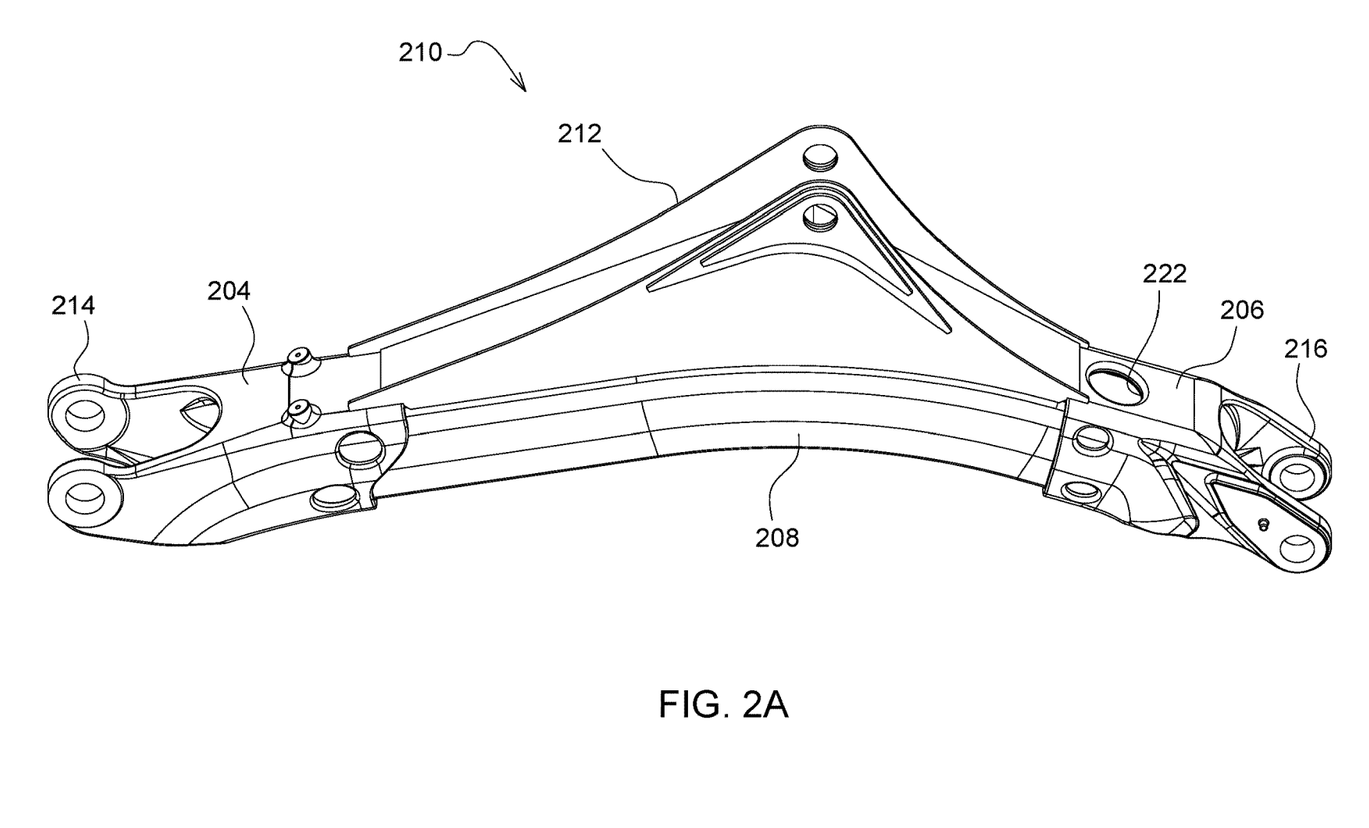
FIG. 2A is a side view of a structural attachment assembly according to an embodiment.

Referring now to FIGS. 2A-4, a support structure 208, which, in some embodiments, is included as part of the structural attachment assembly 210 (e.g., a center portion) of the boom assembly 114, is shown in further detail. For example, as shown in FIGS. 2A and 2B, at least two connector ends (e.g., a first connector end 204 and a second connector end 206) can be operably coupled to the support structure 208 to collectively form the structural attachment assembly 210. The structural attachment assembly 210 can further comprise an auxiliary attachment 212 pivotally coupled to the swing frame 119 of the work vehicle 100. In some embodiments, the auxiliary attachment 212 can comprise a generally triangular shaped profile and at least one surface that is arranged for mating engagement to the support structure 208 (FIG. 2A). In other embodiments, the auxiliary attachment 212 can be arranged separate from the structural attachment assembly 210.

Figure 2B:
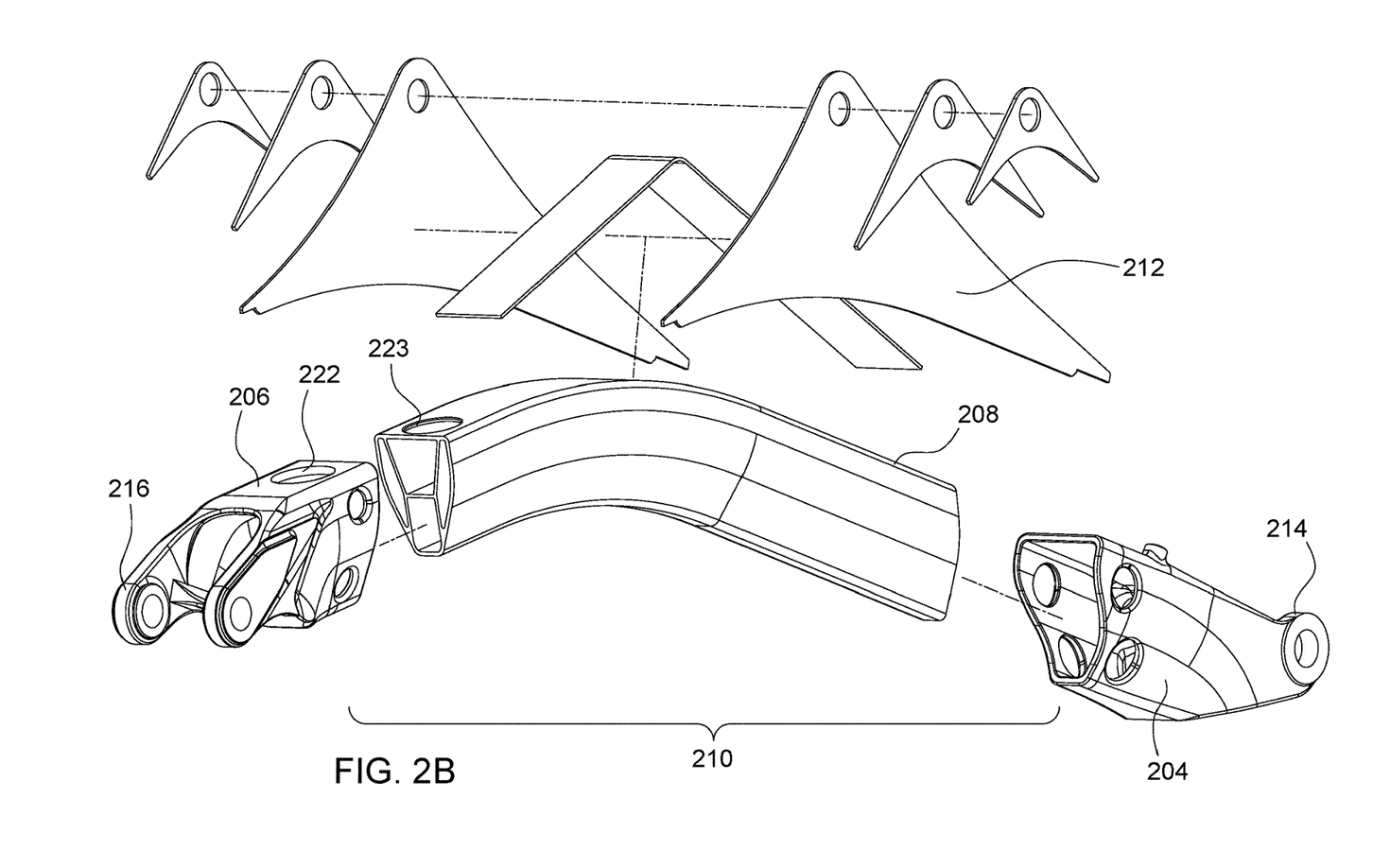
FIG. 2B is an expanded view of the structural attachment assembly of FIG. 2A.
Figure 2C:
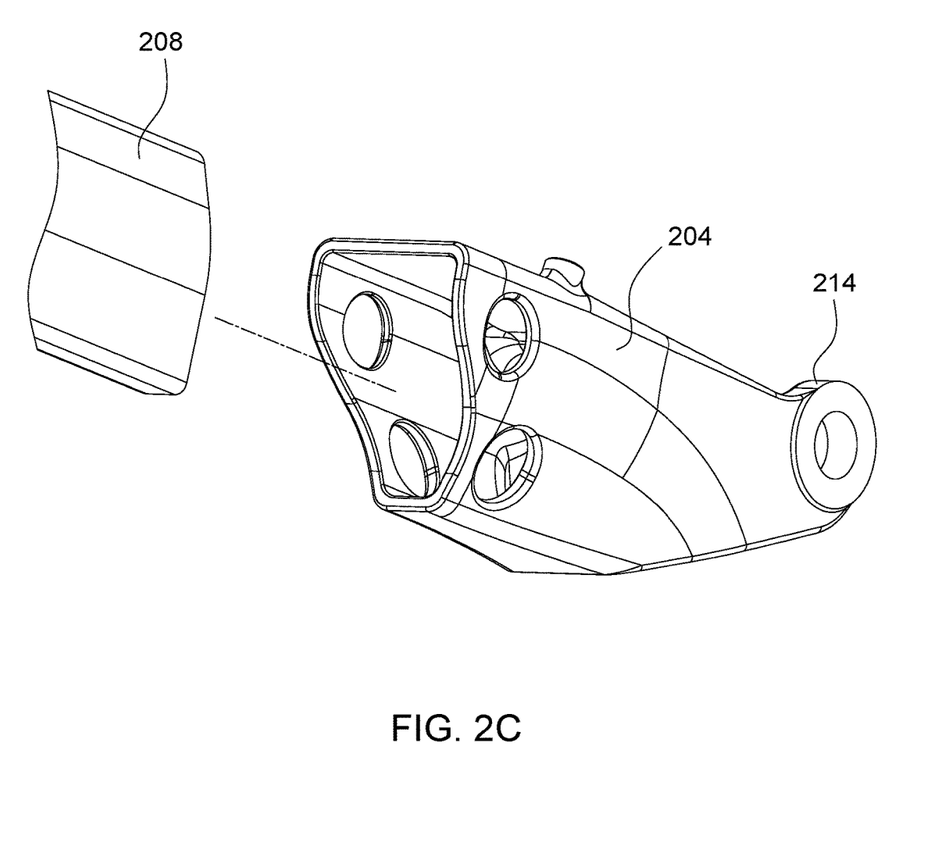
FIG. 2C is an expanded view of a portion of the structural attachment assembly of FIG. 2A.
Figure 4:
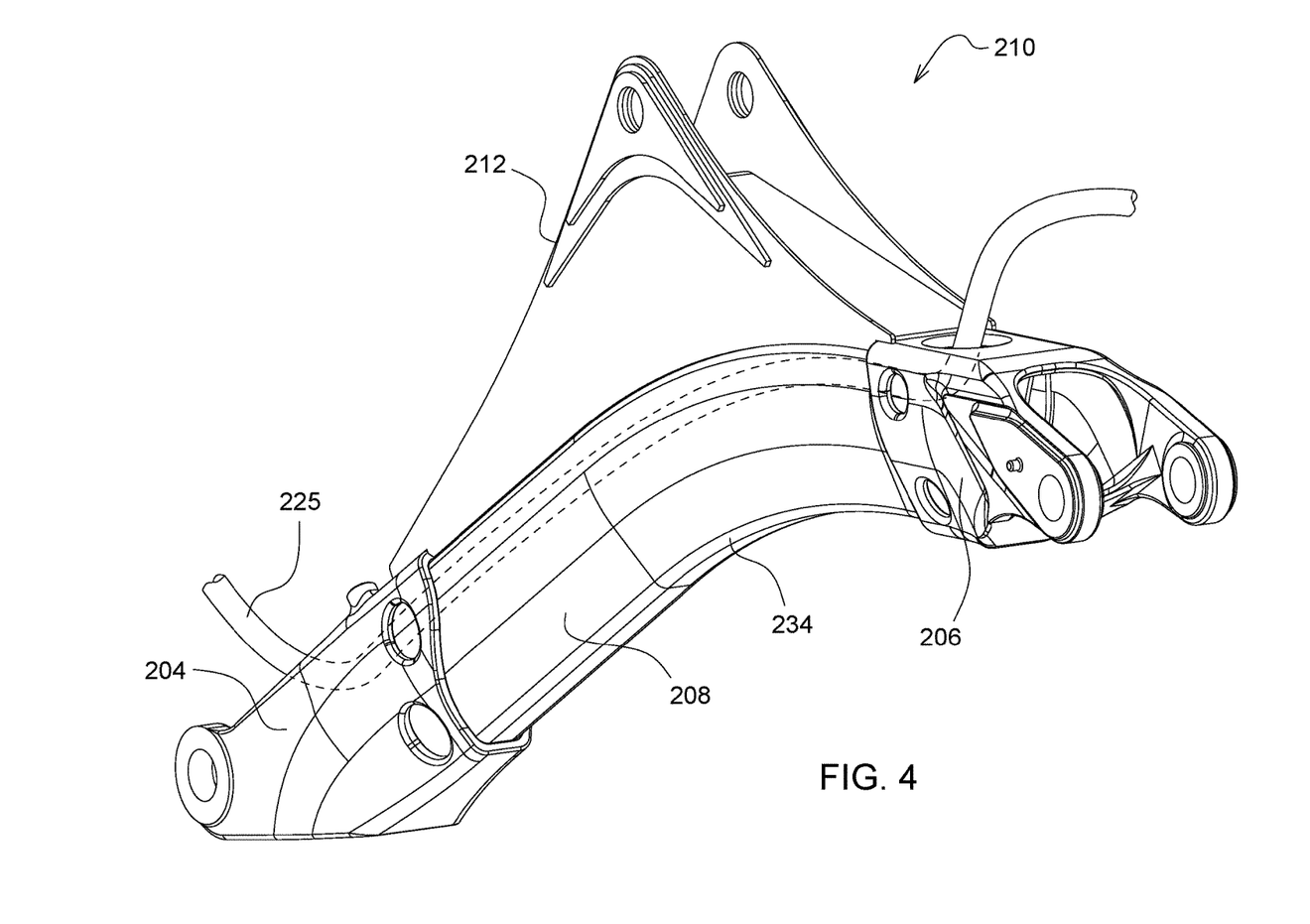
FIG. 4 is a perspective view of the structural attachment assembly of FIG. 2A according to an embodiment.

As shown in FIGS. 2B and 2C, an inner diameter of each of the first and second connector ends 204, 206 can be sized greater than an outer diameter of the support structure 208 to allow for mating engagement of the components. Additionally, each of the first and second connector ends 204, 206 can comprise one or more first and second coupling members 214, 216 that provide for removable or fixed coupling of the connector ends 204, 206 to portions of the frame. For example, the first coupling member 214 of the first connector end 204 can be arranged for removable or fixed coupling to the swing frame 119, and the second coupling member 216 of the second connector end 206 can be arranged for removable or fixed coupling to the extension arm 116. In some embodiments, the first and second connector ends 204, 206 can further comprise at least one connector aperture 222 that axially aligns with an attachment aperture 223 to receive one or more hoses and/or conduit 225. For example, as shown in FIG. 4, the conduit 225 can extend longitudinally through the structural attachment assembly 210 to provide electrical or hydraulic connections to devices such as sensors or valves arranged, e.g., on the boom assembly 114.

Figure 2D:
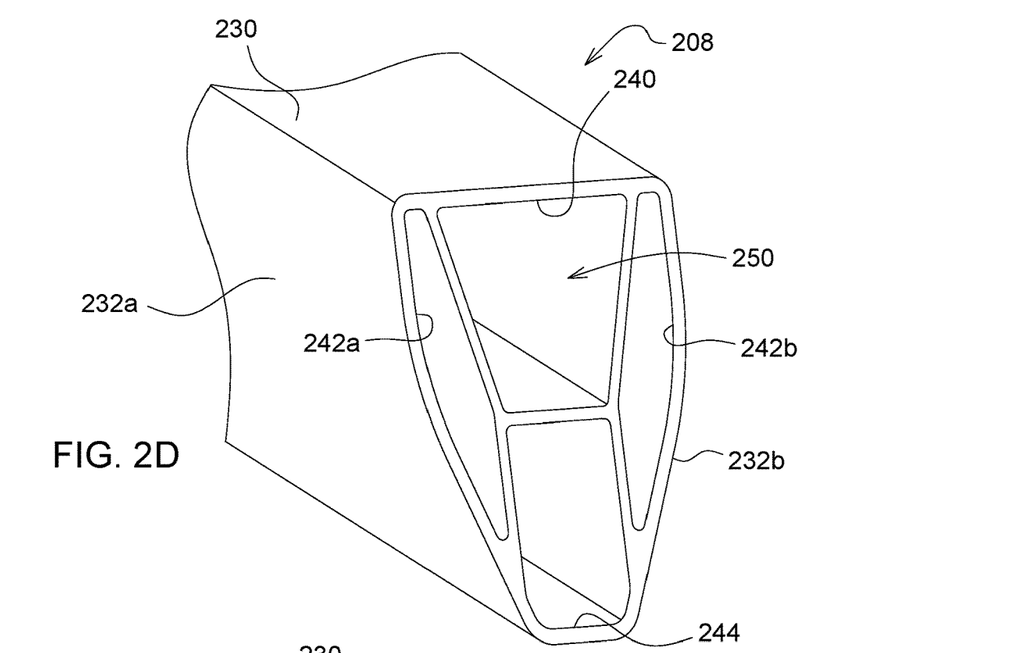
FIG. 2D is a cross-sectional view of a support structure arranged in the structural attachment assembly of FIG. 2A according to an embodiment.
Figure 2E:
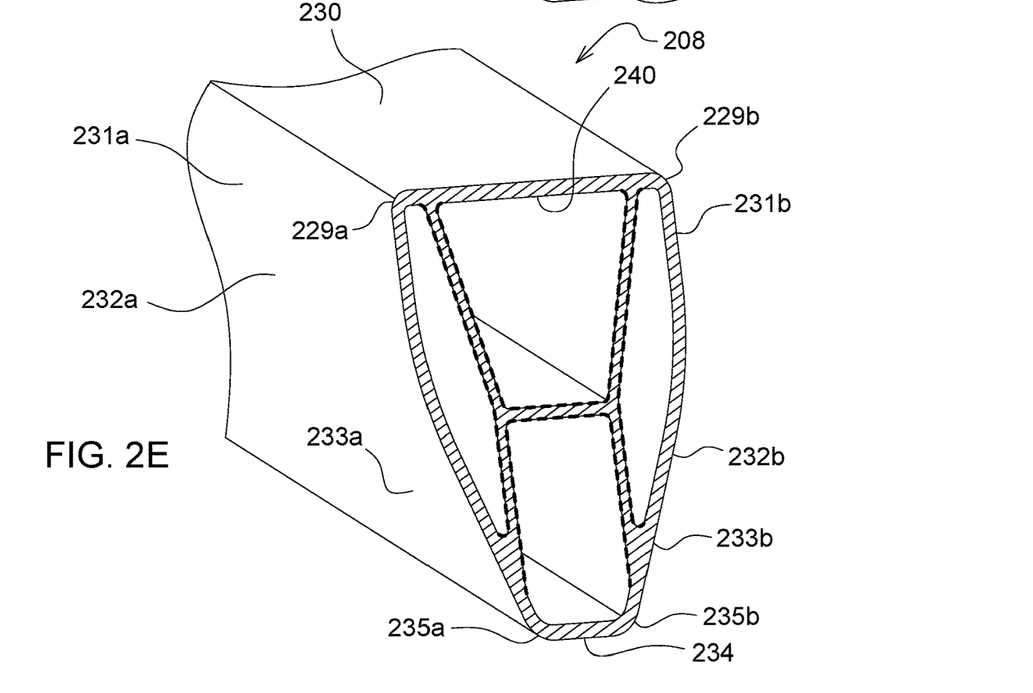
FIG. 2E is a cross-sectional view of the support structure of FIG. 2D.
Figure 3:
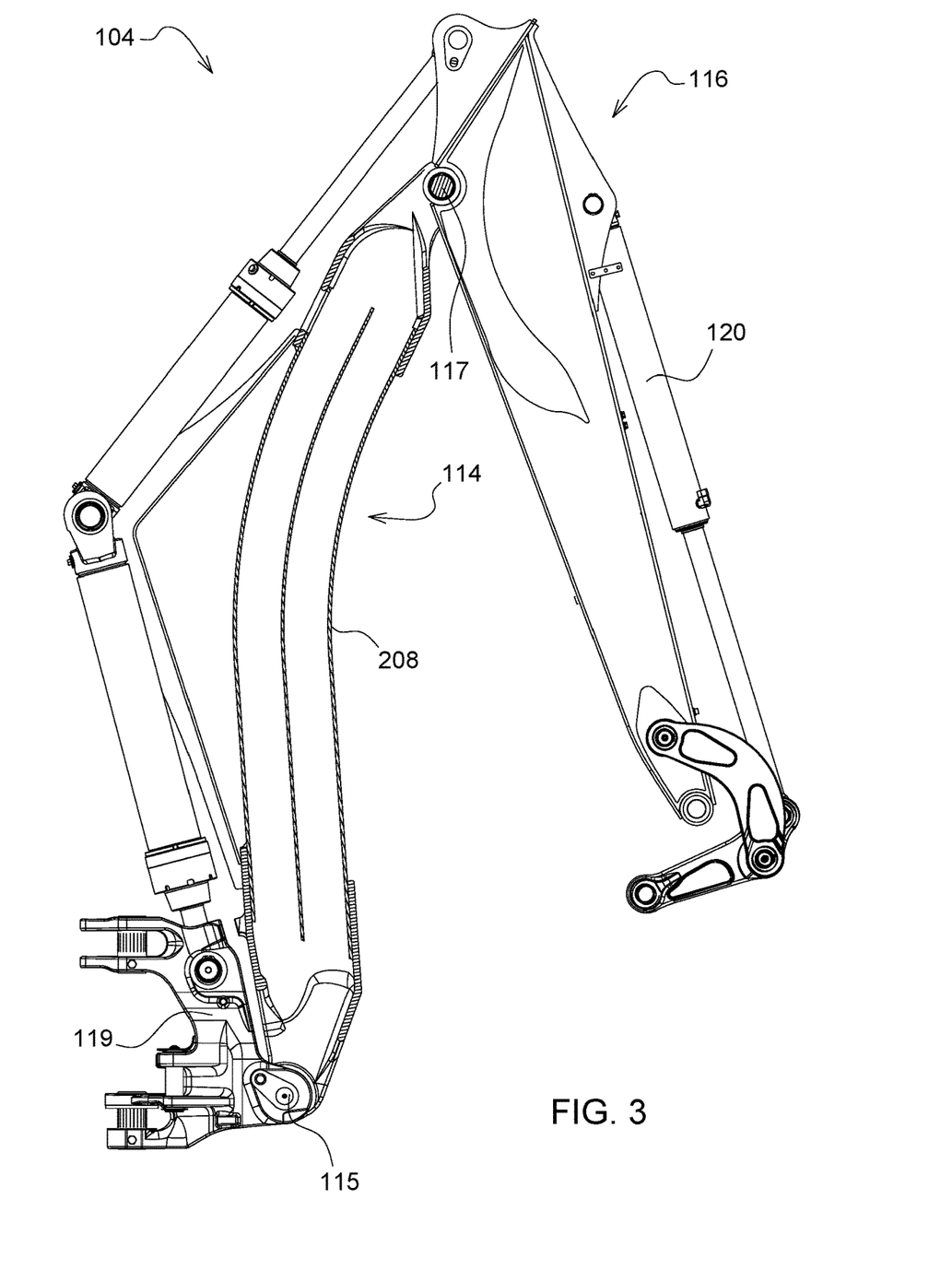
FIG. 3 is a side view of a rear attachment for use with the work vehicle of FIG. 1 according to an embodiment.

In FIG. 2D, a more detailed view of the support structure 208 is provided. In some embodiments, the support structure 208 can comprise a plurality of walls including an upper wall 230, side walls 232a, 232b, and a lower wall 234, each having inner surfaces 240, 242a, 242b, and 244 that are arranged to define an interior cavity 250 that extends longitudinally in a y-direction. In some embodiments, the side walls 232a, 232b can respectively comprise a first wall portion 231a, 231b integrally formed with a second wall portion 233a, 233b, wherein each of the first and second wall portions 231a, 231b, 233a, 233b terminate at edges 229a, 229b, 235a, 235b of the upper and lower walls 230, 234. For example, as shown in FIGS. 2D and 2E, the second wall portions 233a, 233b can be designed to taper and converge inwardly toward the edges 235a, 235b of the lower wall 234. Additionally, as shown in FIG. 4, in some embodiments, the lower wall 234 can comprise a generally arcuate configuration to provide sufficient clearance of the support structure 208 as it passes through a trench.

Figure 5A:
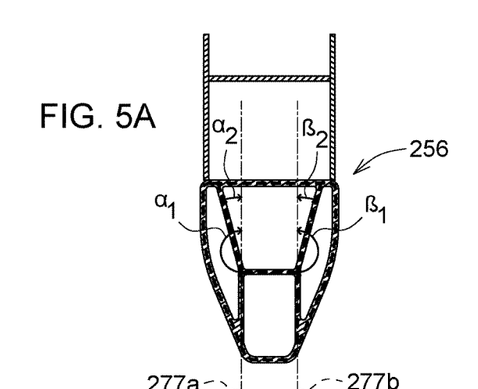
FIG. 5A is a front cross-sectional view of the structural attachment assembly FIG. 2A.
Figure 5B:
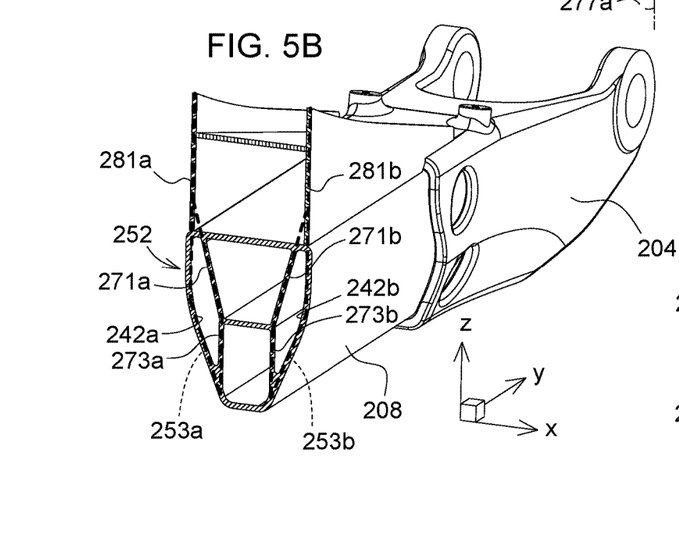
FIG. 5B is a perspective cross-sectional view of the structural attachment assembly FIG. 2A including the support structure of FIG. 2D.
Figure 5C:
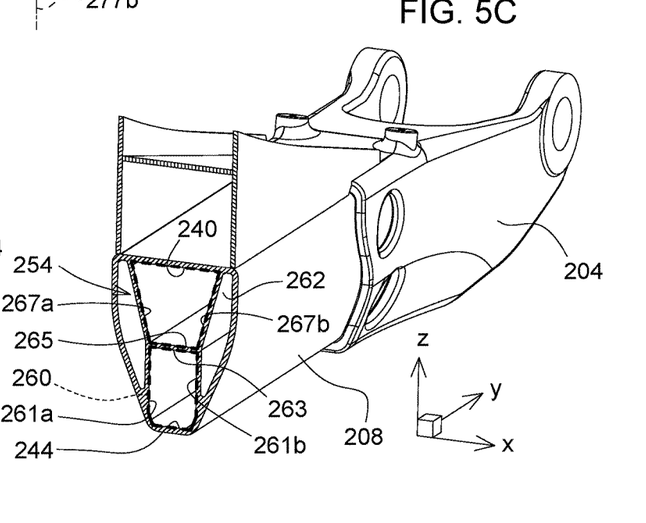
FIG. 5C is a perspective cross-sectional view of the structural attachment assembly of FIG. 2A including the support structure of FIG. 2D.

Referring now to FIGS. 5A-5C, the interior cavity 250 of the support structure 208 can comprise a structural reinforcement member 256 comprising an outer reinforcement member 252 and an inner reinforcement member 254, each extending lengthwise in a y-direction of the interior cavity 250. In some embodiments, the outer reinforcement member 252 can be arranged in apposition to the inner reinforcement member 254. For example, in FIG. 5A, the outer reinforcement member 252 and the inner reinforcement member 254 are shown as being oriented in an x-z plane complimentary to the outside geometry of the load bearing structures such as support structure 208. Such an arrangement is particularly advantageous in that it helps to improve the structural integrity of the support structure 208 and facilitates increased lifting support.

The outer reinforcement member 252 can comprise at least two opposing structures 253a, 253b relatively displaced with respect to one another by a predetermined distance, which is determined based on a size and geometrical configuration of the inner reinforcement member 254. As shown in FIG. 5B, in some embodiments, the two opposing structures can comprise identical structures having mirrored designs, while, in other embodiments, the shape and sizes may vary based on a structural arrangement or geometrical configuration of the support structure 208.

A first surface of the at least two opposing structures 253a, 253b can be formed by the inner surfaces 242a, 242b. The at least two opposing structures 253a, 253b can comprise second surfaces 251a, 251b each having upper surfaces 271a, 271b and lower surfaces 273a, 273b. As shown in FIG. 5A, the upper surfaces 271a, 271b can be angularly displaced by one or more first angles $\alpha_1$, $\beta_1$ from reference axes 277a, 277b. In some embodiments, referring to FIG. 5B, a portion of the structural reinforcement member 256 can be formed by one or more end walls 281a, 281b of the auxiliary attachment 212.

Referring now to FIG. 5B, in some embodiments, the inner reinforcement member 254 can comprise a first structure 260 integrally arranged with a second structure 262. The first structure 260 can comprise a lower base surface formed by the inner surface 244, lower side surfaces 261a, 261b, and a lower top surface 263. Similarly, the second structure 262 can comprise a plurality of surfaces relatively arranged to form the second structure 262. For example, in some embodiments, the second structure 262 can comprise an upper base surface 265, upper side surfaces 267a and 267b, and an upper top surface formed by the inner surface 240. As shown in FIG. 5B, a length of the upper top surface can be greater than that of the upper base surface 265.

Additionally, because of the structural arrangement of the upper side surfaces 267a, 267b relative to the upper surfaces 271a, 271b, the upper side surfaces 267a, 267b also are angularly offset from the reference axes 277a, 277b by respective second angles $\alpha_2$, $\beta_2$. Although in FIG. 5B, the second angles $\alpha_2$, $\beta_2$ are shown as being greater than the first angles $\alpha_1$, $\beta_1$, it should be noted that, in other embodiments, the angular displacement of each of the surfaces can vary, thereby resulting in an increase or decrease of the first angles $\alpha_1$, $\beta_1$ and the second angles $\alpha_2$, $\beta_2$. Further, although in FIG. 5C each of the top surfaces and base surfaces of the first and second structures 260, 262 are shown as being arranged parallel to one another in respective x-y planes, in other embodiments the relative arrangement can vary. In still other embodiments, rather than having a single structural reinforcement member 256, the support structure 208 can comprise a plurality of structural reinforcement members 256 arranged within the interior cavity 250, as well as other suitable configurations and designs.

Without in any way limiting the scope, interpretation, or application of the claims appearing below, a technical effect of one or more of the example embodiments disclosed herein is an improved structural attachment assembly including a structural reinforcement member. The configuration of the structural attachment assembly is particularly advantageous in that it provides increased structural integrity and lifting support.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A structural attachment assembly for a work vehicle, the structural attachment assembly comprising:
    opposing first and second connector ends, wherein the first connector end is arranged for removable or fixed coupling to a frame of the work vehicle and the second connector end is arranged for removable or fixed coupling to another member of the structural attachment assembly; and
    a support structure coupled to and interposedly arranged between the first connector end and the second connector end, the support structure comprising a plurality of walls with inner surfaces defining an interior cavity, the interior cavity having a first reinforcement member and a second reinforcement member relatively arranged to form a structural reinforcement member that extends substantially through a length of the interior cavity,
    wherein the first reinforcement member comprises at least two opposing and symmetric structures spaced apart relative to one another based on a size of the second reinforcement member, and wherein the second reinforcement member comprises at least three surfaces, all of which are symmetric with respect to a central vertical plane along the support structure, including a horizontal surface, a vertical surface below the horizontal surface, and an oblique surface above the horizontal surface.

2. The structural attachment assembly of claim 1, wherein the first connector end, the second connector end, and the support structure are arranged in at least one of a boom assembly, an extension arm assembly, or combinations thereof.

3. The structural attachment assembly of claim 1, wherein each of the first connector end, the second connector end, and the support structure comprise a metallic material comprising one or more of the following: aluminum, stainless steel, carbon-fiber, or combinations thereof.

4. The structural attachment assembly of claim 1, wherein each of the first connector end and the second connector end comprise an inner diameter that is greater than an outer diameter of the support structure.

5. The structural attachment assembly of claim 1, further comprising an auxiliary attachment arranged for pivotal coupling to the frame of the work vehicle.

6. The structural attachment assembly of claim 1, wherein a geometrical configuration of each of the first reinforcement member and the second reinforcement member conforms to an outer shape of the support structure.

7. The structural attachment assembly of claim 6, wherein the first reinforcement member and the second reinforcement member are arranged to extend longitudinally in a direction perpendicular to one or more reference axes.

8. The structural attachment assembly of claim 1, wherein the first reinforcement member comprises at least two upper side surfaces that share a common wall with the oblique surface of the second reinforcement member.

9. The structural attachment assembly of claim 8, wherein each of the upper side surfaces are angularly displaced in an oblique configuration relative to the oblique surface of the second reinforcement member.

10. The structural attachment assembly of claim 7, wherein the second reinforcement member comprises a first structure integrally arranged with a second structure, and wherein at least two side walls of the first structure are angularly displaced outwardly from a reference axis.

11. A work tool attachment for a work vehicle, the work tool comprising:
    at least one ground engaging apparatus operable to perform one or more ground engaging tasks;
    a structural attachment assembly coupled to or integrally formed with the ground engaging apparatus, the structural attachment assembly comprising at least one support structure, a first connector end, and a second connector end; and
    a structural reinforcement member arranged within the support structure, the structural reinforcement member comprising a first reinforcement member and a second reinforcement member relatively arranged and extending substantially through a length of an interior cavity of the support structure, wherein the first reinforcement member comprises at least two opposing and symmetric structures spaced apart relative to one another based on a size of the second reinforcement member, and wherein the second reinforcement member comprises at least three surfaces, all of which are symmetric with respect to a central vertical plane along the support structure, including a horizontal surface, a vertical surface below the horizontal surface, and an oblique surface above the horizontal surface.

12. The work tool attachment of claim 11, wherein the structural attachment assembly and the structural reinforcement member respectively comprise a metallic material including one or more of the following: aluminum, stainless steel, carbon-fiber, or combinations thereof.

13. The work tool attachment of claim 11, wherein each of the first end connector and the second end connector comprise an inner diameter that is greater than an outer diameter of the support structure.

14. The work tool attachment of claim 11, wherein the structural attachment assembly further comprises an auxiliary attachment arranged for pivotal coupling to a frame of the work vehicle.

15. The work tool attachment of claim 11, wherein a geometrical configuration of each of the first reinforcement member and the second reinforcement member conforms to an outer shape of the support structure.

16. The work tool attachment of claim 15, wherein the first reinforcement member comprises at least two upper side surfaces that share a common wall with the oblique surface of the second reinforcement member, and wherein each of the upper side surfaces are angularly displaced in an oblique configuration relative to the oblique surface of the second reinforcement member.

17. A method, the method comprising:
providing a structural attachment assembly comprising a support structure and at least one connector end, the support structure comprising a plurality of walls arranged to define an interior cavity;
forming a first reinforcement member within the interior cavity of the support structure; and
forming a second reinforcement member within an interior cavity of the support structure in apposition to the first reinforcement member to form a structural reinforcement member, wherein the first reinforcement member comprises at least two opposing and symmetric structures spaced apart relative to one another based on a size of the second reinforcement member, and wherein the second reinforcement member comprises at least three surfaces, all of which are symmetric with respect to a central vertical plane along the support structure, including a horizontal surface, a vertical surface below the horizontal surface, and an oblique surface above the horizontal surface.

18. The method of claim 17, wherein the first reinforcement member comprises at least two least two upper side surfaces that share a common wall with the oblique surface of the second reinforcement member.

19. The method of claim 17, wherein the second reinforcement member comprises a first structure integrally arranged with a second structure, and wherein at least two side walls of the first structure are angularly displaced outwardly from a reference axis.

20. The method of claim 17, wherein the structural attachment assembly is arranged for removable or fixed coupling to a work tool arranged on a work vehicle.

* * * * *